United States Patent [19]

Shulick

[11] 3,999,516
[45] Dec. 28, 1976

[54] MILKER WITH RESILIENT PULSATOR MANIFOLD MOUNTING

[75] Inventor: Robert J. Shulick, St. Charles, Ill.

[73] Assignee: Babson Brothers Company, Oak Brook, Ill.

[22] Filed: Dec. 22, 1975

[21] Appl. No.: 643,474

Related U.S. Application Data

[63] Continuation-in-part of Ser. No. 587,215, June 13, 1975, abandoned.

[52] U.S. Cl. .......................... 119/14.1; 119/14.54
[51] Int. Cl.² .......................................... A01J 7/00
[58] Field of Search ........... 119/14.54, 14.1, 14.13, 119/14.37

[56] References Cited

UNITED STATES PATENTS

| | | | |
|---|---|---|---|
| 1,285,338 | 11/1918 | Oden et al. | 119/14.54 |
| 1,301,992 | 4/1919 | Anderson | 119/14.54 |
| 1,478,802 | 12/1923 | Stampen | 119/14.45 |
| 2,490,366 | 12/1949 | Lowry | 119/14.54 |
| 2,683,437 | 7/1954 | Merritt | 119/14.36 |

*Primary Examiner*—Hugh R. Chamblee
*Attorney, Agent, or Firm*—Wegner, Stellman, McCord, Wiles & Wood

[57] ABSTRACT

A milker with a milk receiving chamber for suspension beneath a cow has teat cups connected therewith for attachment to the cow's teats. A pulsation vacuum manifold, connected with the teat cups, is mounted to the cover of the milk receiving chamber by a coil spring, to accommodate movement of the cow. The manifold movement is limited by connecting the pulsation hose and the milk hose together.

10 Claims, 5 Drawing Figures

MILKER WITH RESILIENT PULSATOR MANIFOLD MOUNTING

This application is a continuation-in-part of Shulick application Ser. No. 587,215, filed June 13, 1975, now abandoned, and assigned to the assignee of this application.

This invention is concerned with a milking apparatus.

A typical suspended milker, see for example Shulick et al U.S. Pat. No. 3,540,416 and U.S. Pat. No. Des. 214,481, has a milk receiving chamber, teat cups with inflations connected to the receiving chamber for attachment to the cow's teats, and a pulsation vacuum manifold or valve fixed on the milk receiver and connected through short tubes with the shells of the teat cups. Cow movement during the milking may twist the inflations or pulsation vacuum tube so as to pull off a teat cup. The milk receiving chamber or bowl has a stainless steel base and cover and a transparent plastic wall. It is heavy and expensive to manufacture. The milk receiving chamber of this invention has a single piece cover and wall molded of plastic, is lighter and less expensive than prior milkers.

In accordance with the invention, the pulsation vacuum manifold is resiliently mounted on the milk receiving chamber to accommodate cow movement. More particularly, a coil spring is secured at one end to the cover of the milk receiving chamber and extends upwardly therefrom. The pulsation vacuum manifold is secured to the other end of the coil spring so that it may twist and move with respect to the milk receiving chamber as the cow moves about. In the preferred form of the milker, the pulsation hose is secured to the milk hose at a point adjacent the milk receiving chamber, limiting the movement of the pulsation manifold.

Further features and advantages of the invention will readily be apparent from the following specification and from the drawings, in which.

Figure 1:
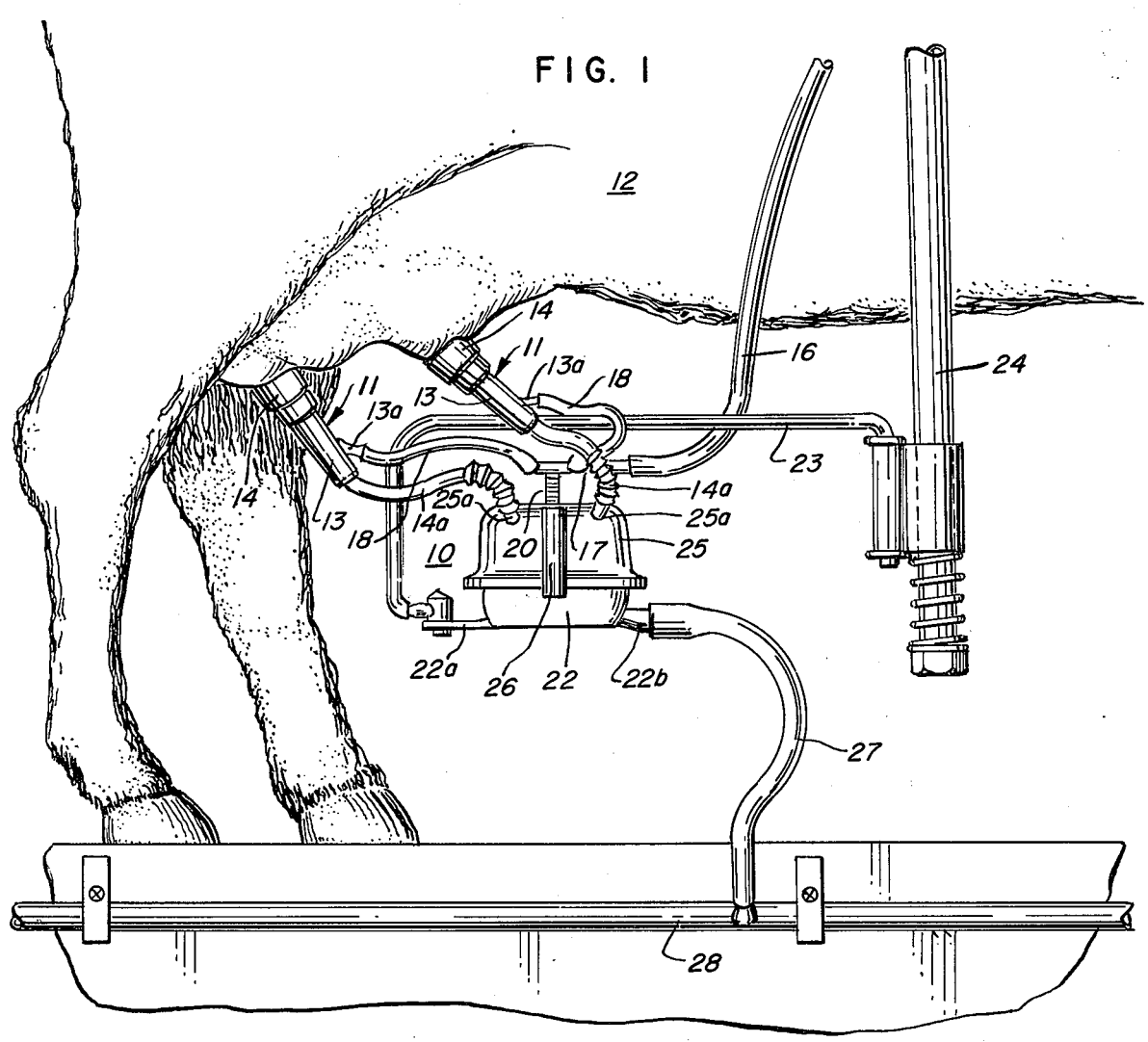
FIG. 1 is an elevational view illustrating the invention and showing those portions of the cow, milker support and milking system as are necessary for an understanding of the invention.

The invention is illustrated with a suspended milker unit 10 which has four teat cups 11 (two are visible in FIG. 1) connected with the teats of the cow 12. Each teat cup has a shell 13 and a flexible inflation or liner 14 with a stem 14a connected with milker receiver 10. Alternate vacuum and air pulsations are supplied to each teat cup shell from a source of pulsation vacuum (not shown) to expand and collapse inflations 14. Hose 16 is connected from the pulsation vacuum source with pulsation vacuum manifold 17 and tubes 18 connect the manifold with nipples 13a on the teat cup shells.

In accordance with the invention, manifold 17 is resiliently mounted on milk receiver 10 by a spring 20, permitting the cow to move about without twisting tubes 18 or pulling off a teat cup.

More particularly, milk receiver 10 has a base 22, preferably of stainless steel. Plate 22a extending rearwardly from the base is mounted on an arm 23 carried from a milker support 24 which may be adjusted vertically and horizontally to position the milk receiver 10 below and forward of the cow's udder. A dome shaped cover 25 is secured to base 22 by a retainer 26. Cover 25 is preferably molded of a transparent plastic to enable the operator to observe milk flow. The stems 14a of inflations 14 are connected with nipples 25a which extend outwardly and upwardly from cover 25 and are preferably spaced 90° apart. A milk hose 27 is connected between an outlet nipple 22b extending forwardly from the base of the milk receiver and an evacuated milk pipeline 28. The milk is delivered through the pipeline to a suitable bulk storage tank or the like.

The pulsation manifold 17 cannot be molded as an integral part of cover 25. Efforts to secure the manifold to the cover with adhesive were unsatisfactory. Movement of the cow or handling by the operator often knocked the manifold off. The mounting spring 20 provides a secure mounting which accommodates limited movement and does not require expensive fittings.

Figure 2:
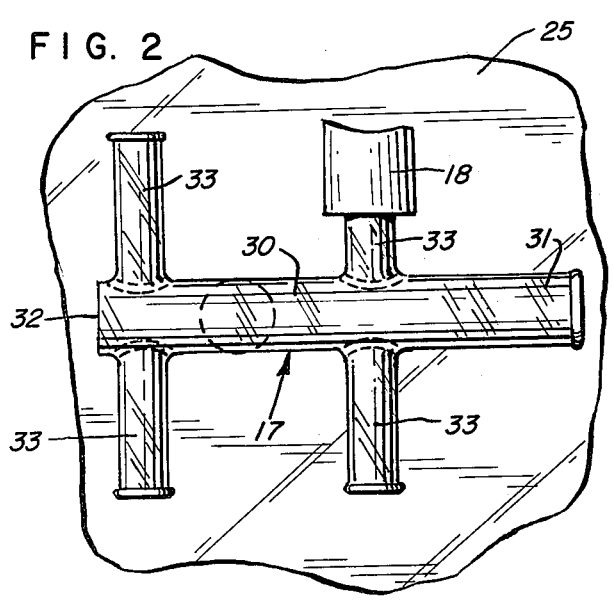
FIG. 2 is a fragmentary enlarged plan view showing the pulsation vacuum manifold with some of the hoses and tubes removed.
Figure 3:
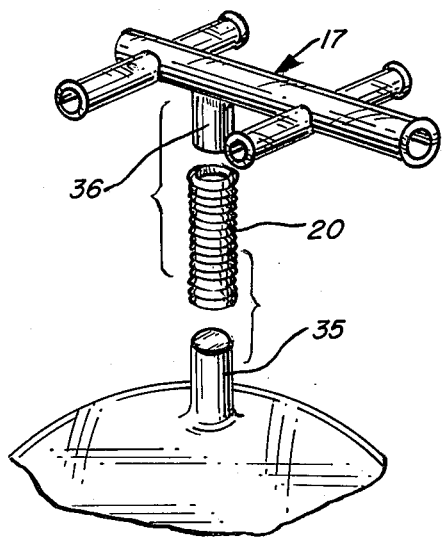
FIG. 3 is a fragmentary exploded perspective illustrating the mounting of the pulsation vacuum manifold on the milk receiver.

The pulsation vacuum manifold and resilient mounting spring 20 are illustrated in more detail in FIGS. 2 and 3. The manifold may be molded from plastic and includes a center tube 30 having an inlet nipple 31 at one end for connection with pulsation vacuum hose 16 and closed at the other end 32. Four branch outlet tubes 33 are arranged in two opposed pairs spaced axially on center tube 30.

Resilient mounting spring 20 is a tightly coiled spiral spring mounted at its lower end on a post 35 which extends upwardly from the center of the domed cover 25 of the milk receiver. A complementary post 36 extends downwardly from the undersurface of center tube 30 of manifold 17 and is received in the upper end of coil spring 20. Post 36 is located between the two pairs of branch tubes 33.

Movement of the cow during milking causes the application of forces of varying magnitude and direction to be applied to the teat cups through the inflation stems 14a and the pulsation vacuum tubes 18. Coiled mounting spring 20 allows manifold 17 to tilt, turn and twist with respect to milk receiver cover 25 to accommodate the cow's movement while minimizing the pull at the teat cups. The central location of post 35 on the milker unit and of post 36 on manifold 17 distributes the forces uniformly on spring 20.

Movement of the cow during milking with the milker of FIG. 1 sometimes causes the pulsation vacuum hose 16 to turn or tilt manifold 17 causing one or more of the pulsation tubes 18 to kink. This restricts the flow of air through the pulsation tube and causes the teat cup inflations to expand and collapse sluggishly.

Figure 4:
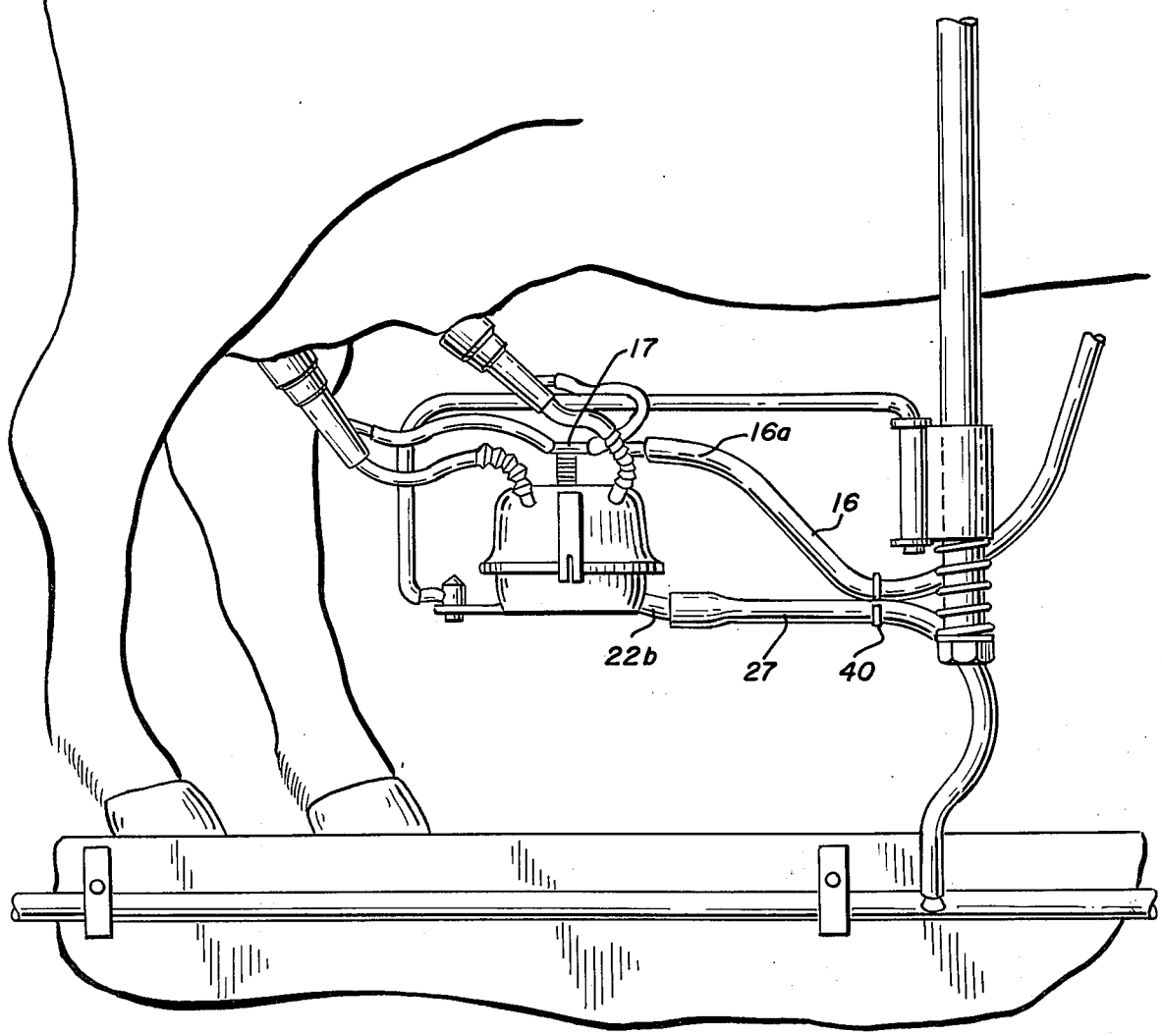
FIG. 4 is a view similar to FIG. 1 of a preferred form of the invention.
Figure 5:
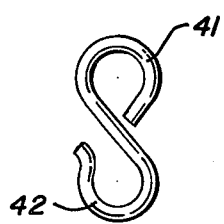
FIG. 5 is an elevation of a hook for securing the pulsation and milk hoses together.

This problem is alleviated by connecting the pulsation vacuum hose 16 to the milk hose 27 as illustrated in FIG. 4. Milk hose 27 is heavier and less flexible than the pulsation vacuum hose 16. Moreover, the milk hose is connected to the milk receiver outlet nipple 22b. Both factors contribute to a greater stability of that portion of the milk hose 27 adjacent the milk receiver than the portion of the pulsation vacuum hose 16 adjacent manifold 17. In accordance with the invention, the pulsation manifold hose 16 is connected with milk hose 27 at a point closely adjacent the milk receiving chamber. This connection between the hoses limits the movement of the pulsation vacuum manifold, keeping it positioned generally parallel with the central plane of the milk receiver and preventing excessive rotation with respect to the nipples and teat cups.

More particularly, the two hoses extend from the chamber generally parallel with each other, the vacuum pulsation hose 16 being about 5 inches above the milk hose 27. The hoses are connected by a double S hook 40 located 6 or 7 inches from the milk receiver. The double ended S hook has a closed end portion 41 in which the pulsation vacuum hose 16 is received and an open end portion 42 in which the milk hose is received. This permits ready separation of the hoses in the event it is desirable to disconnect them for disassembly of the milker. Preferably, the hook fits snugly on the hoses, holding the pulsation vacuum hose 16 so that the end 16a is arced as illustrated. Pulsation vacuum manifold 17 is thus restrained from twisting and held in a plane generally parallel with the plane of the milker.

I claim:

1. In a milker having a milk receiving chamber to be suspended beneath a cow and connected through a milk hose with an evacuated milk receiver, four teat cups for attachment to the cow's teats, connected with the chamber and a pulsation vacuum manifold connected with a source of pulsation vacuum and with the shell of each teat cup, the improvement comprising:
a resilient spring member having spaced ends with one end secured to the top of the milk receiving chamber and having the pulsation vacuum manifold secured to the other end for limited movement of the pulsation vacuum manifold with respect to the milk receiving chamber, to accommodate movement of the cow while minimizing the strain on the connections between the pulsation vacuum manifold and the teat cup shells.

2. The pulsation manifold mounting of claim 1 in which said spring member is an elongate coil spring secured at one end to the top of said milk receiving chamber and at the other end to the bottom of said pulsation vacuum manifold.

3. The pulsation vacuum manifold mounting of claim 2 in which there is a post extending upwardly from the top of said milk receiving chamber and said coil spring has one end mounted on said post.

4. The pulsation vacuum manifold mounting of claim 3 in which the manifold has a mounting post depending from the bottom thereof which is received in the other end of said coil spring.

5. The pulsation vacuum manifold mounting of claim 4 in which said manifold has a center tube with two pairs of branch tubes extending outwardly for connection with the shell of each teat cup, one pair being spaced axially of the center tube from the other pair, said mounting post depending from the bottom of the center tube at a point intermediate said two pairs of branch tubes.

6. A milker comprising:
a milk receiving chamber for suspension beneath a cow and having a dome shaped cover with nipples extending outwardly and upwardly therefrom;
teat cups for connection with the cow's teats each including a shell with a pulsation vacuum connection and inner inflation with a stem connected to a nipple on said milk receiving chamber;
a milk hose connected at one end with said chamber and having its other end for connection with an evacuated milk receiver;
a pulsation vacuum manifold having an inlet and a plurality of outlets;
a resilient spring member having spaced ends with one end secured to the top of said chamber cover between said nipples, the spring member extending upwardly from the chamber cover and having the pulsation vacuum manifold secured to the other end;
a resilient hose connecting each manifold outlet with one of said teat cup shells; and
a hose connecting the manifold inlet with a source of pulsation vacuum.

7. The milker of claim 6 in which the spring member is a coil spring secured at one end to the top of the chamber cover and at the other end to the underside of the pulsation vacuum manifold.

8. The milker of claim 6 including means for limiting movement of the pulsation vacuum manifold with respect to said chamber cover.

9. The milker of claim 8 in which said movement limiting means includes means connecting the milk and pulsation vacuum hoses together at a point adjacent said chamber to keep the pulsation vacuum manifold generally parallel with the central plane of the milk receiving chamber and to limit rotation of the manifold with respect to the teat cup nipples.

10. The milker of claim 9 in which said hoses extend from said milker and are generally parallel with each other, the pulsation vacuum hose being above the milk hose and said connecting means is a double ended S-shaped hose hook with the milk hose extending through one end and the pulsation vacuum hose extending through the other.

* * * * *

UNITED STATES PATENT AND TRADEMARK OFFICE
CERTIFICATE OF CORRECTION

PATENT NO. : 3,999,516
DATED : December 28, 1976
INVENTOR(S) : Robert J. Shulick It is certified that error appears in the above-identified patent and that said Letters Patent are hereby corrected as shown below:

[73] Assignee: change "Babson Brothers Company" to --

Babson Bros. Co. --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*